(12) United States Patent
Rufer et al.

(10) Patent No.: US 8,046,194 B2
(45) Date of Patent: Oct. 25, 2011

(54) METHOD FOR PREDICTIVE MAINTENANCE AND/OR METHOD FOR DETERMINING ELECTRICAL CONDUCTIVITY IN A MAGNETO-INDUCTIVE FLOW-MEASURING DEVICE

(75) Inventors: Heinz Rufer, Dornach (CH); Wolfgang Drahm, Freising (DE); Frank Schmalzried, Freising (DE)

(73) Assignee: Endress + Hauser Flowtec AG, Reinach (CH)

( * ) Notice: Subject to any disclaimer, the term of this patent is extended or adjusted under 35 U.S.C. 154(b) by 726 days.

(21) Appl. No.: 12/076,137

(22) Filed: Mar. 14, 2008

(65) Prior Publication Data

US 2008/0262796 A1    Oct. 23, 2008

(30) Foreign Application Priority Data

Mar. 22, 2007   (DE) .......................... 10 2007 014 469

(51) Int. Cl.
- G06F 11/30     (2006.01)
- G21C 17/00     (2006.01)
- G01F 1/00      (2006.01)
- G01F 1/58      (2006.01)
- G01F 1/60      (2006.01)

(52) U.S. Cl. .... 702/184; 702/45; 73/861.11; 73/861.12; 73/861.13; 73/861.14; 73/861.15; 73/861.16; 73/861.17

(58) Field of Classification Search .................. 702/45, 702/184; 73/861.11, 861.12, 861.13, 861.14, 73/861.15, 861.16, 861.17
See application file for complete search history.

(56) References Cited

U.S. PATENT DOCUMENTS

| | | | | |
|---|---|---|---|---|
| 4,969,363 A * | 11/1990 | Mochizuki | ................ | 73/861.17 |
| 5,503,027 A * | 4/1996 | Hemp | ....................... | 73/861.12 |
| 6,369,579 B1 * | 4/2002 | Riegel | ........................... | 324/439 |
| 6,634,238 B2 * | 10/2003 | Budmiger | ................. | 73/861.17 |
| 6,804,613 B2 * | 10/2004 | Ishikawa et al. | ................ | 702/45 |
| 6,962,087 B2 * | 11/2005 | Wray | ........................ | 73/861.12 |
| 2003/0051557 A1 | 3/2003 | Ishikawa | | |
| 2004/0027132 A1 * | 2/2004 | Budmiger | ..................... | 324/439 |

(Continued)

FOREIGN PATENT DOCUMENTS

DE         102 43 748 A1       4/2003

(Continued)

*Primary Examiner* — Mohamed Charioui
*Assistant Examiner* — Janet Suglo
(74) *Attorney, Agent, or Firm* — Bacon & Thomas, PLLC

(57) ABSTRACT

A method for predictive maintenance for a magneto-inductive flow-measuring device and/or to a method for determining electrical conductivity of a medium flowing through a magneto-inductive flow-measuring device, wherein the magneto-inductive flow-measuring device includes a magnet system, which produces a magnetic field passing through the measuring tube essentially transversely to a measuring tube axis; at least two measuring electrodes coupled with the medium, having a defined rest potential and being arranged in a region of the measuring tube lying essentially perpendicularly to the magnetic field; and a control/evaluation unit, which delivers information concerning volume- or mass-flow of the medium on the basis of measurement voltage induced in the measuring electrodes. A first exciting signal with a first frequency ($f_1$) and at least a second exciting signal with a second frequency ($f_2$), or an exciting signal containing at least two frequencies ($f_1$, $f_2$) are/is applied to the measuring electrode in such a manner that the average value of the exciting signals or exciting signal coincides, at least approximately, with the average value of the electrode potential of the measuring electrode. On the basis of at least one impedance value measured between measuring electrode and reference potential, conductivity of the medium and/or change on the surface of the measuring electrode are/is detected.

9 Claims, 5 Drawing Sheets

U.S. PATENT DOCUMENTS

| | | |
|---|---|---|
| 2005/0109120 A1* | 5/2005 | Turner .................. 73/861.12 |
| 2005/0115334 A1* | 6/2005 | Brockhaus et al. ........ 73/861.11 |
| 2009/0205438 A1 | 8/2009 | Budmiger |

FOREIGN PATENT DOCUMENTS

| | | |
|---|---|---|
| DE | 10 2005 039 223 A1 | 2/2007 |
| EP | 0 336 615 | 10/1989 |
| EP | 0 557 529 A1 | 9/1993 |
| EP | 0 915 324 A2 | 5/1999 |
| EP | 1536211 A1 | 6/2005 |
| GB | 2 434 871 A | 8/2007 |

* cited by examiner

METHOD FOR PREDICTIVE MAINTENANCE AND/OR METHOD FOR DETERMINING ELECTRICAL CONDUCTIVITY IN A MAGNETO-INDUCTIVE FLOW-MEASURING DEVICE

TECHNICAL FIELD

The invention relates to a method for predictive maintenance for a magneto-inductive flow-measuring device and/or to a method for determining electrical conductivity of a medium flowing through the measuring tube of a magneto-inductive flow-measuring device in the direction of the longitudinal axis.

BACKGROUND DISCUSSION

A magneto-inductive flow-measuring device includes the following components:
- A magnet system, which produces a magnetic field passing through the measuring tube essentially perpendicularly to the measuring tube axis;
- at least two measuring electrodes coupled with the medium, the measuring electrodes being of defined rest potential and arranged in a region of the measuring tube lying essentially perpendicularly to the magnetic field; and
- a control/evaluation unit, which delivers, on the basis of the measurement voltage induced in the measuring electrodes, information concerning volume- or mass-flow of the medium in the measuring tube.

Corresponding magneto-inductive flow-measuring devices are available from the company, Endress+Hauser in a plurality of embodiments, such as those offered and distributed under the mark PROMAG.

Described in DE 103 56 007 B3 is a magneto-inductive flow-measuring device providing an added feature. In order to achieve this added feature, an electrical current is applied between a measuring electrode and a reference electrode or a fill-level monitoring electrode. The voltage present in such case between the measuring electrodes is measured and from the ratio of the measured voltage to the applied electrical current, a first resistance value is ascertained. Then, the first measuring electrode is replaced by the second measuring electrode and the above-described method steps are repeated, whereby a second resistance value is available. By forming the difference or quotient of the two ascertained resistance values, a critical coating of one of the two measuring electrodes is detected, when the formed ratio, or difference, lies outside of a predetermined range of values. Disadvantageous in the case of this flow-measuring device is that each of the measuring electrodes is moved out of rest potential by the application of an electrical current, i.e. the rest potential shifts. In order subsequently to be able to perform a correct flow measurement, it is necessary to wait until the equilibrium state has again been reached. Since less measuring time is available, the measuring accuracy of the flow-measuring device is reduced.

EP 0 336 615 B1 discloses an electromagnetic flow-measuring device which permits simultaneous determination of flow of a medium through a measuring tube of the flow-measuring device and the electrical conductivity of the medium. The flow-measuring device includes the components named in the introduction. Beyond the known flow-measuring devices, the solution disclosed in this European publication includes a means for producing from an output signal produced likewise as the flow measurement signal from the two measuring electrodes a conductivity signal representing the conductivity of the medium. For this purpose, in addition to the alternating, rectangularly shaped, exciting signal for the magnet system, a means is provided for producing an electrical pulse which is applied to the magnet system via a corresponding control, in each case, at the beginning of each half cycle of the exciting signal.

U.S. Pat. No. 6,804,613 discloses an electromagnetic flow meter, which can ascertain, besides the information concerning flow, also information for detecting an empty tube, an accretion adhering to the measuring electrode, or the electrical conductivity of the medium flowing through the measuring tube. For this purpose, diagnostic signals are applied, in each case, between one of the two measuring electrodes and a grounding electrode. The corresponding diagnostic signal generators are either constant current supplies or constant voltage supplies, with the diagnostic signal generators using alternating signals, whose frequency is a whole-numbered multiple of the exciting frequency used in the excitation circuit for the magnet system. Additionally, a diagnostic circuit is provided, which synchronizes the excitation frequency of the magnet system with the frequency of the diagnostic signal. Especially, the conductivity of the medium or the formation of an accretion on the measuring electrodes is determined via measurement of the resistance of the measuring electrodes or via measurement of resistance between a measuring electrode and the grounding electrode.

Disadvantageous in the known method is that, here, it is assumed that the measured resistance of the liquid stands in a unique relationship with the conductivity of the medium. In the region of higher conductivities, the measuring range of a conductivity-measuring cell is limited by the phase transition from the measuring electrode to the liquid. The impedance of the phase transition behaves only in the ideal case purely capacitively; in the real case, the impedance of the phase transition has also an ohmic portion. If this portion can no longer be neglected compared to the ohmic resistance of the medium, then the measured conductivity of the medium contains error. As a result, the measuring range of the conductivity-measuring cell has an upper limit.

For the purpose of eliminating this problem, EP 0 990 984 B1 discloses an improved measuring cell for determining electrical conductivity of a liquid medium. Especially, the liquid medium is, in this case, a calibration solution for pH electrodes. Here, the impedance of the measuring cell extending into the liquid is ascertained at least two frequency values of an alternating voltage. From the ascertained impedance values, based on an equivalent circuit, frequency independent parameters and the resistance value, from which the conductivity is ascertained, are determined. The equivalent circuit is composed of a parallel connection of a capacitor representing the capacitance of the measuring cell and an ohmic resistance representing the sought resistance of the liquid within the measuring cell, as well as an electrical component connected in series with the ohmic resistance and having a frequency-independent phase. In the case of each of the at least two frequency values, the real part and the imaginary part of the impedance of the measuring cell are ascertained. From the ascertained values, subsequently, the frequency-independent parameters and the sought resistance are calculated. Then, the calculation of the electrical conductivity is done.

SUMMARY OF THE INVENTION

An object of the invention is to so embody a flow-measuring device that, besides the flow measurement values, precise information concerning the conductivity of the medium or a physical change at a measuring electrode is provided.

The object is achieved by the features that a first excitation signal with a first frequency and at least a second excitation signal with a second frequency, or an excitation signal, which contains two frequencies, are/is applied to the measuring electrode in such a manner that the average value of the excitation signals, or excitation signal, at least approximately coincides with the average value of the electrode potential of the measuring electrode, and that, on the basis of at least one impedance value measured between measuring electrode and reference potential (grounding electrode, grounding ring, etc.), the conductivity of the medium or the change at the measuring electrode is detected. The change at the measuring electrode can be brought about either by accretion formation or by corrosion.

Preferably applied as excitation signal is a first pulse sequence with a first frequency and a second pulse sequence with a second frequency. The two pulse sequences are preferably applied to the measuring electrode following one after the other—here preferably, in each case, synchronously or asynchronously to the switching of the magnetic field. Of course, the two measurement cycles, in which the pulse sequences are, in each case, applied, neither need to directly follow one another, nor do they, as already stated, need to be synchronized with the switching of the magnetic field. Rather, the pulse sequences can be applied to the measuring electrode both synchronously as well as asynchronously to the switching of the magnetic field. The pulse sequence is, for example, a sequence of rectangularly shaped pulses. However, other types of pulse sequences, e.g. sinusoidal pulses, can be applied in connection with the present invention.

In an alternative embodiment of the method, it is provided that a pseudo noise is applied as exciting signal, with the noise exhibiting a plurality of frequencies, thus a frequency spectrum. The corresponding excitation signal is referred to as a digital, white noise. In turn, the individual pulses exhibit, preferably, a rectangular form. An alternative test- and/or exciting-signal is a multi-tone signal, which can be optimally matched to the particular measurement problem.

For improving accuracy of measurement, it has been found to be advantageous to apply as exciting-signal a signal in which, following transformation from time domain to frequency domain, the side bands are strongly attenuated.

According to an advantageous embodiment of the method of the invention, steps are taken as follows:

In predetermined time intervals, the flow measurement is interrupted and the last measured value of flow is stored, or frozen;

at a first interruption of the flow measurement, a first exciting signal with a first frequency is applied to the measuring electrode and, at a second interruption of the flow measurement, a second exciting signal with a second frequency is applied to the measuring electrode.

On the basis of at least one ascertained impedance value, the conductivity is determined, or it is detected whether a change has occurred on the measuring electrode.

Especially, it is provided that the optimum frequency and/or the optimum amplitude value of the pulse sequence, or the at least two pulse sequences, with different frequencies, at which the impedance values are ascertained, are ascertained as a function of the medium. Preferably, the frequencies of the signals applied to the measuring electrode lie between 10 Hz up to 10 kHz. In an embodiment, for example, four frequencies are selected: 60 Hz, 110 Hz, 440 Hz and 1.1 kHz. In selecting the frequencies, attention should especially be paid that they do not coincide with the grid frequency or the switching frequency of the magnetic field. The more frequencies there are selected for determining conductivity, the more accurately the absolute value spectrum and phase spectrum, and consequently, the conductivity can be ascertained.

In the simplest case, only the real parts, thus the absolute values, of the impedance values are drawn upon for determining conductivity. For this purpose, successively, at least two pulse sequences with different frequencies are applied to the measuring electrode. If the absolute values of the impedance values are equal within tolerable limits, then it is assumed that the measurement is being done in a region in which the absolute value of the impedance value is approximately constant and therefore depends functionally on the conductivity. Then, a reliable statement can be made as regards the conductivity of the medium.

Alternatively, the frequencies of the pulse sequence are successively changed. In addition to the absolute values, furthermore, also the phase values of the impedance values can be ascertained. At that frequency at which the phase shift of the impedance is a minimum, the corresponding absolute value of the impedance is drawn upon for determining the conductivity. Another option, of course, is to ascertain the impedance values over the entire frequency spectrum and to determine therefrom conductivity and change on the measuring electrode highly accurately.

Thus, in an advantageous embodiment of the method of the invention, it is provided that, at least two frequencies, the amplitude values or the amplitude spectrum, or the real parts of the impedance values and the phase values, or the phase spectrum, or the imaginary parts of the corresponding impedance values are determined and that, on the basis of the real parts and the imaginary parts, frequency independent parameters, especially n, Q and the resistance, or the conductivity, of the medium are ascertained. In principle, it is sufficient for this purpose, as described in EP 0 990 894, to make two measurements at different frequencies. The greater the number of measurements made, the lesser is the measurement error in the determination of conductivity.

In such case, procedure is preferably such that an equivalent circuit diagram is applied to each ascertained impedance value, with the equivalent circuit diagram being formed by a parallel connection of a capacitor representing the capacitance of the measuring electrode and an ohmic resistance representing the sought resistance of the medium between the potential of the measuring electrode and the reference potential, as well as an electrical component Z connected in series with the ohmic resistance and having a frequency-independent phase, with the component Z being described by the following impedance:

$$Z_{CPE} = \frac{1}{Q \cdot (2\pi f \cdot i)^n}$$

wherein n and Q are two frequency-independent parameters.

Additionally, in an advantageous embodiment of the method of the invention, it is provided that, in predetermined time intervals, the actual value of the frequency-independent parameter Q is compared with a desired value of Q ascertained at a predetermined starting point of the flow-measuring device, and that a change on the surface of the measuring electrode is signaled, when the deviation between the actual value and the desired value of Q exceeds a predetermined tolerance range. The change can arise from either an accretion formation on the measuring electrode or from corrosion on the measuring electrode.

As already stated, it is furthermore provided that the frequency of the pulse sequence is successively changed, until the phase value (imaginary part) of the ascertained impedance values reaches a minimum, and that, at the frequency of the pulse sequence, at which the phase value is a minimum, the associated amplitude value (real part) of the impedance value is drawn upon for determining the resistance, or for determining the conductivity, of the medium. Preferably, the conductivity values of the medium serving for process monitoring are provided simultaneously with the flow measured values. Especially, it is provided in this connection that the flow measured values are provided during each measurement cycle, while the conductivity values are made available at larger intervals of about 1 ms. Sensor diagnosis, thus especially the monitoring of changes on the measuring electrodes, can be done at greater time intervals. Here, it makes sense to perform a measurement of the complete frequency spectrum—a procedure which is correspondingly time consuming. Since changes on the measuring electrode arise over a relatively long period of time, it is possible to use the time-intensive evaluating of amplitude- and/or phase-spectrum required for such purpose. An accretion formation or corrosion on the measuring electrode can be detected via a comparison of historical data.

BRIEF DESCRIPTION OF THE DRAWINGS

The invention will now be explained in greater detail on the basis of the appended drawing, the figures of which show as follows.

DETAILED DISCUSSION

Figure 1:
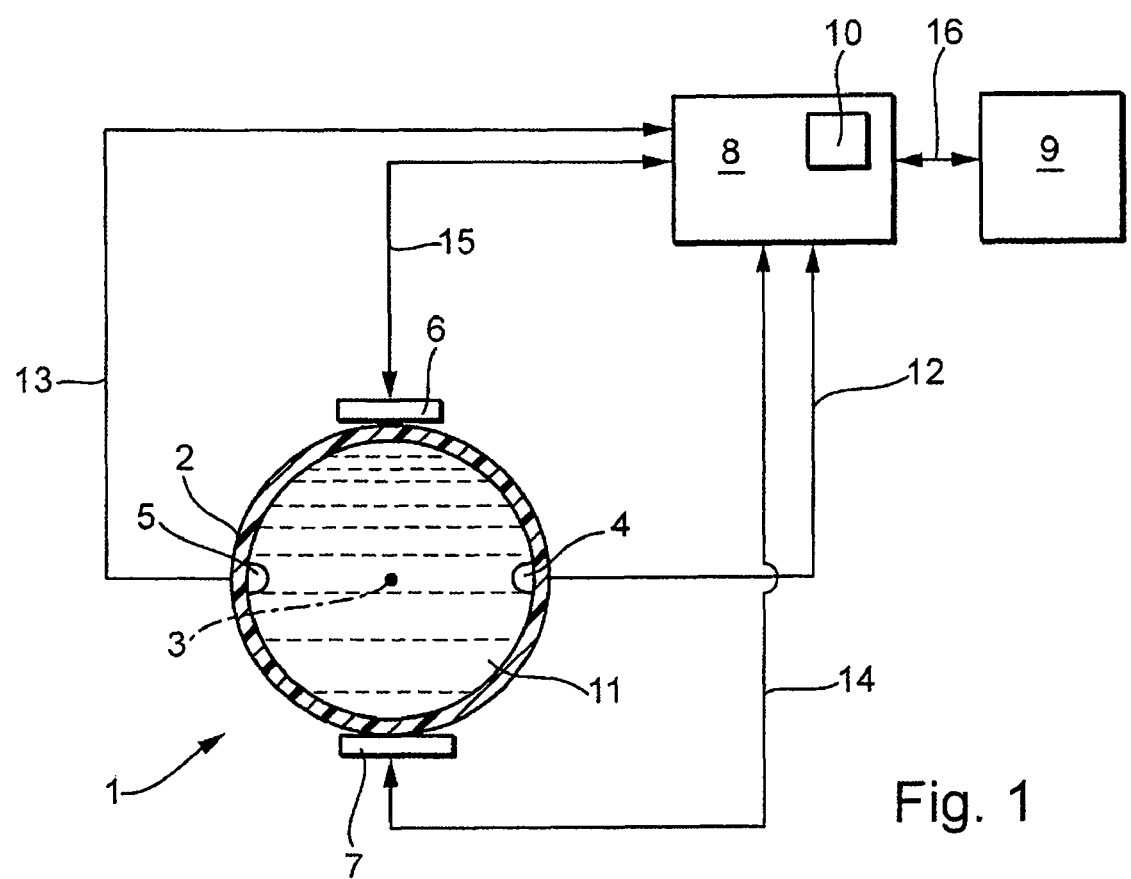
FIG. 1 is a schematic representation of a magneto-inductive flow-measuring device; in which the method of the invention is implemented.

FIG. 1 shows a schematic drawing of an embodiment of the apparatus 1 of the invention. Medium 11 flows through the measuring tube 2 in the direction of the measuring tube axis 3. Medium 11 is at least slightly electrically conductive.

Measuring tube 2 is lined on its inner surface with a liner 18; liner 18 is made of a non-conductive material, which may be chemically and/or mechanically resistant to a high degree.

The magnetic field B directed perpendicularly to the flow direction of the medium 11 is produced by a magnet system, e.g. two diametrically arranged coil arrangements 6, 7, i.e. two electromagnets. Under the influence of the magnetic field B, charge carriers located in the medium 11 migrate, depending on polarity, to the two oppositely poled measuring electrodes 4, 5. The measurement voltage arising on the measuring electrodes 4, 5 is proportional to the flow velocity of the medium 11 averaged over the cross section of the measuring tube 2, i.e. it is a measure for the volume flow, e.g. volume flow rate, of the medium 11 in the measuring tube 2. Measuring tube 2 is, moreover, connected via connecting elements, e.g. flanges, with a pipe system (not shown), through which the medium 11 flows.

The two measuring electrodes 4, 5 are, in the illustrated case, button-shaped measuring electrodes in direct contact with the medium 11. Of course, also rod-shaped electrodes or any other known types of measuring electrodes may be applied in connection with the invention.

Measuring electrodes 4, 5 are connected with the control/evaluation unit 8 via connecting lines 12, 13. Connection between the coil arrangements 6, 7 and the control/evaluation unit 8 is accomplished via the connecting lines 14, 15. The control/evaluation unit 8 is connected via the connecting line 16 with an input/output unit 9. Associated with the evaluation/control unit 8 is a memory unit 10.

According to the invention, the electrical conductivity $\chi$ is ascertained with the known magneto-inductive flow-measuring device. Fundamentally, the following can be said here: In order to provide the relationship between the measured conductance G and the electrical conductivity $\chi$ of a homogeneous medium, it is necessary to know the geometry of the pertinent measuring arrangement. The geometry of a measuring arrangement can usually be described via a constant, numerical value referred to as cell constant k.

Figure 2:
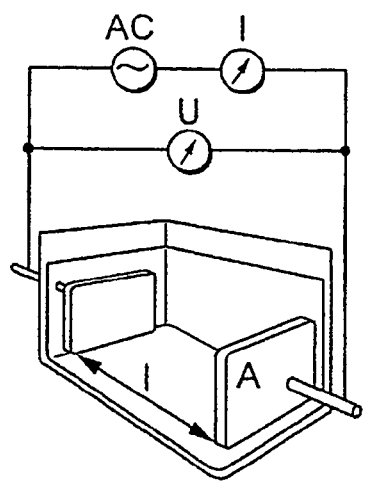
FIG. 2 is a schematic drawing of a measuring arrangement having two parallel measuring electrodes.
Figure 5:
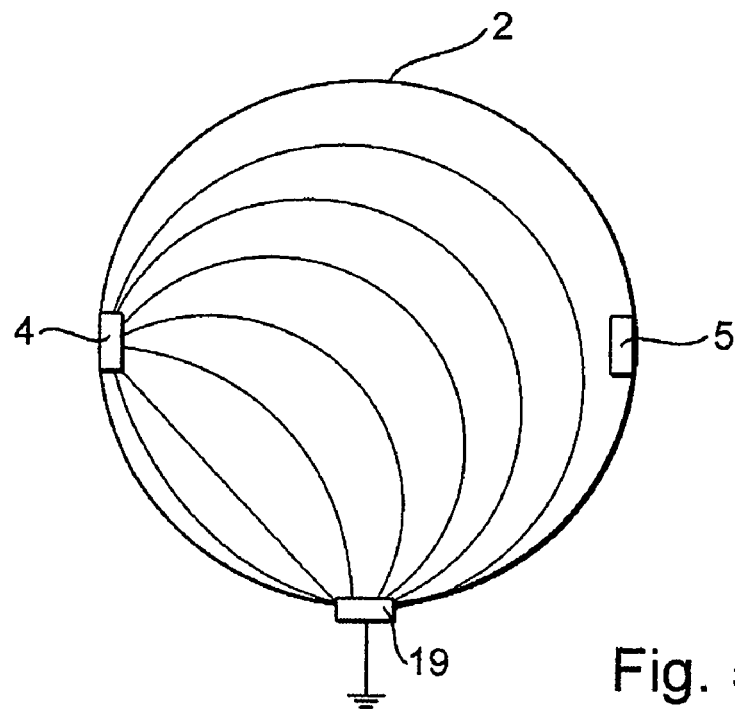
FIG. 5 is a schematic representation of the electric field flux lines between measuring electrode and ground electrode in the case of measurement with a magneto-inductive flow-measuring device.

For a block-shaped arrangement of two plate-shaped electrodes, such as is illustrated in FIG. 2, the conductivity $\chi$ can be determined as follows:

$$\chi = \frac{l}{A} \cdot G = k \cdot G = \frac{k}{R}$$

wherein the following definitions hold:
  $\chi$: electrical conductivity in S/cm
  G, R: measured conductance in S, resistance in ohms
  k: cell constant in 1/cm
  A: area of an electrode in $cm^2$
  L: spacing of the two electrodes In the case of other geometries, especially in the case of the geometry present in a magneto-inductive flow-measuring device, the cell constant k is ascertained either by a simulation of the electric field flux lines or by measurement with a calibration solution of known conductivity. The electric field flux lines in the case of a measurement with a magneto-inductive flow-measuring device 1 between a measuring electrode 4; 5 and the ground electrode 19 is shown schematically in FIG. 5.

Problematic in such case is that the measurement of the electrical conductivity $\chi$ of an electrolyte solution cannot be carried out with a direct voltage, since the direct current associated therewith would lead to a discharge of the ions on the measuring electrode, such being connected with a chemical reaction. In order that this reaction occur at all, a certain minimum voltage Ez is required—see, in this connection, also FIG. 3. This minimum voltage Ez is dependent on different variables, e.g. the medium and the temperature. Due to this non-linear behavior, performing the measurement with direct voltage is not possible.

This effect can be explained on the basis that a so-called electric double-layer forms between medium and electrolyte and exhibits a capacitive behavior. This is shown schematically in FIG. 4. If one uses, instead of the direct voltage, an electric alternating voltage of suitable frequency and amplitude (<=100 mV), then it is possible to keep the impedance of the double-layer capacitance small relative to the ohmic resistance of the medium 11.

The electric double-layer does not have the electric behavior of an ideal capacitance, but, instead, can be approximately described by a circuit element referred to in electrochemistry as a Constant Phase Element—CPE.

The complex impedance Z of a CPE can be expressed as follows:

$$Z_{CPE} = \frac{1}{Q \cdot (2\pi f \cdot i)^n},$$

wherein the frequency-independent parameter n is less than one. In the case of an ideal capacitance, n is equal to 1. The second frequency-independent parameter Q has the physical unit, farad. For n not equal to 1, no physical unit can be associated with the parameter Q. The CPE serves as a purely descriptive element for the experimentally registered behavior as a function of frequency.

Figure 6:
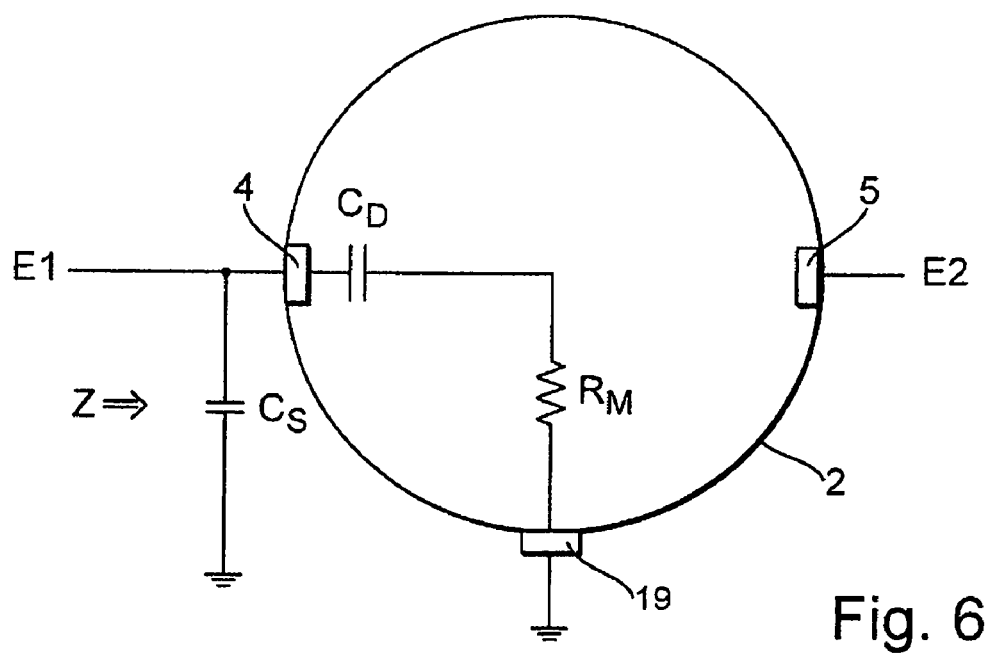
FIG. 6 is an equivalent circuit diagram for ascertaining conductivity and a physical change on the measuring electrode according to the method of the invention.

A usable equivalent circuit diagram for the conductivity measurement with a magneto-inductive flow-measuring device is illustrated in FIG. 6. The CPE is assumed for the double-layer capacitance $C_D$.

With the equivalent circuit diagram, the conductivity and, in suitable circumstances, a further variable is/are ascertained. The further variable is e.g. the change on the measuring electrode 4; 5 in contact with the medium 11. This change can be brought about by an accretion formation or by corrosion on the surface of the measuring electrode 4; 5.

The equivalent circuit diagram is composed of a parallel connection having two branches, one of which is formed by a capacitor having a stray capacitance $C_S$. The other branch is composed of a series connection of a resistance $R_M$ and the frequency-dependent component CPE. The resistance $R_M$ represents the ohmic resistance of the medium 11. Component CPE represents or simulates, in such case, the processes arising at the phase transition between the measuring electrode 4; 5 and the medium 11.

The calculative formula for the model thus turns out to be:

$$Z = \frac{\frac{1}{C_S \cdot 2\pi f \cdot j} \cdot \left(\frac{1}{Q \cdot (2\pi f \cdot i)^n} + R_M\right)}{\frac{1}{C_S \cdot 2\pi f \cdot j} + \frac{1}{Q \cdot (2\pi f \cdot i)^n} + R_M}.$$

Figure 7A:
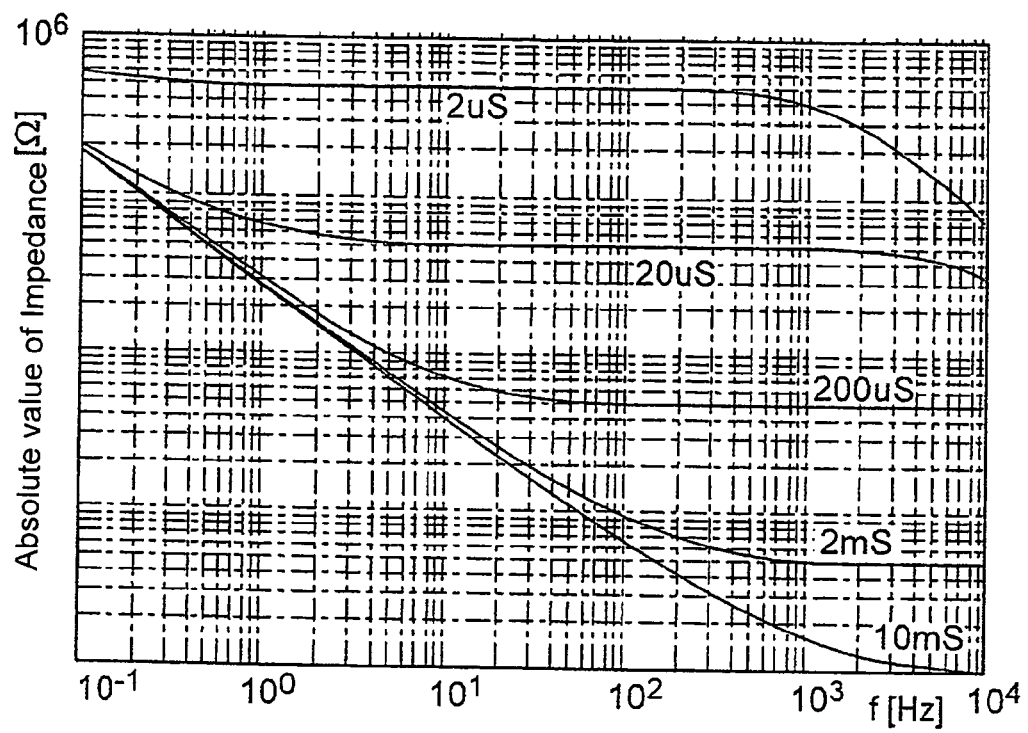
FIG. 7a is a graphical presentation of absolute value of impedance vs. frequency for different electrical conductivities of the medium.
Figure 7B:
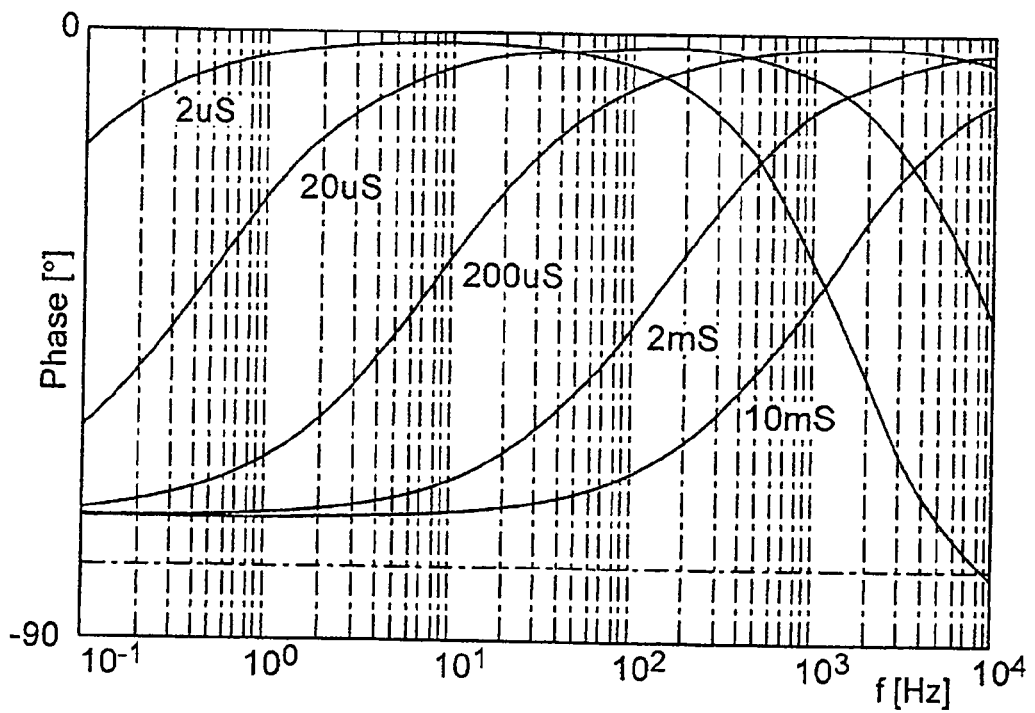
FIG. 7b is a graphical presentation of the phase of impedance vs. frequency for different electrical conductivities of the medium.

Plotted in FIGS. 7a and 7b are absolute value and phase as a function of frequency for various conductivities. Supplied for the parameters were the following values typical for magneto-inductive flow-measuring devices:

$C_S$=200 pF; $Q$=8$E$−6; n=0.8; $k$=1/cm

The plot of absolute value versus frequency, as illustrated in FIG. 7a, shows a marked plateau, which is determined essentially by the resistance $R_M$ of the medium. This plateau correlates with a minimum of the phase shift.

For ascertaining conductivity, different methods are available:

The phase minimum can thus be used as a unique criterion for a suitable frequency f for the exciting signal.

If the phase information is not available, then a search method can be applied to find and select a frequency $f_n$ in whose vicinity the absolute value of the impedance scarcely changes.

For a highly accurate determination of conductivity, complete development of the model of FIG. 6 is required. For such purpose, at least two complex impedance measurements (each measurement provides two independent variables) are required at different frequencies $f_1$, $f_2$, since a total of four independent parameters must be determined: Q, n, $C_s$, $R_M$. The parameters Q, n and $C_s$ can be evaluated for diagnostic purposes, since they reflect the state of the transition system measuring-electrode-to-electrolyte, the connecting cables for the measuring electrodes, etc. The calculation leads to a non-linear equation system, which can be solved with known numerical methods.

FIGS. 7a, 7b show that, for determining a high conductivity, a high frequency is required. In the case of known conductivity measuring devices, the cell constant k is simply matched to the pertinent measuring range. In the case of a magneto-inductive flow-measuring device, this is not possible, since the cell constant k is fixedly predetermined by the flow-measuring device 1. Determination of conductivity can, however, as already mentioned, be done by development of the model. In this connection, it is also not necessary to shift the test frequencies of the exciting signals into the region of the phase minimum.

It can be seen, additionally, in the graphs of FIGS. 7a and 7b that, in the region of high conductivities, the measurement is no longer influenced by the stray capacitance $C_S$. The model can then be simplified to a series connection composed of $R_M$ and CPE. The formula for the impedance then becomes:

$$Z = \frac{1}{Q \cdot (2\pi f \cdot i)^n} + R_M$$

Additionally, the value 0.8 can be used to a good approximation for the parameter n, since this value reflects quite well the value ascertained on the basis of experimental determinations. In such case, it must, however, be noted, in qualification, that this value of 0.8 fits well only when the measuring electrode 4; 5 is free of accretion.

If one then measures the complex impedance at a frequency f, then the parameters Q and $R_M$ can be determined by solving a linear equation system.

According to the invention, the conductivity measurement in the case of the magneto-inductive flow-measuring device 1, e.g. in the case of the Promag 55 instrument available from the assignee, is carried out in alternation with the flow measurement. The conductivity measurement should, in such case, use as short a length of time as possible, in order that the flow measurement be disturbed as little as possible. Used as test, or exciting, signal are short pulse sequences of suitable frequency and amplitude.

Figure 8:
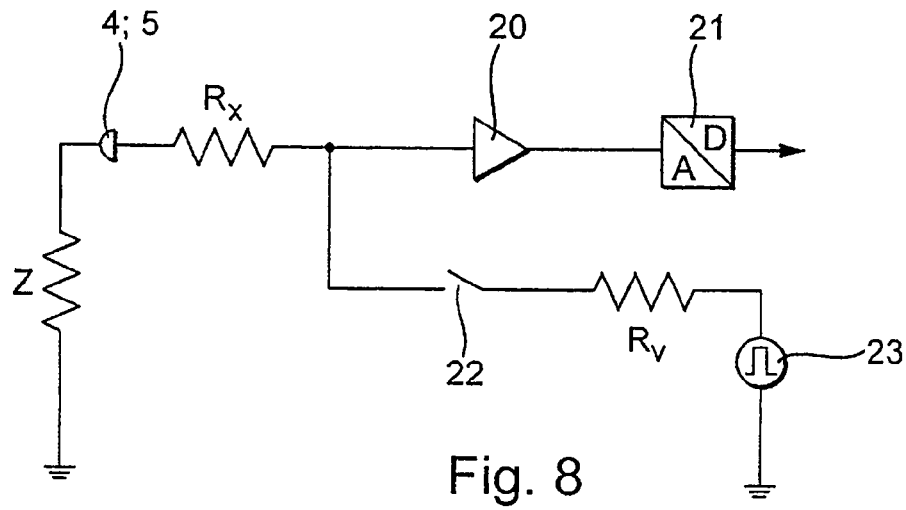
FIG. 8 is a representation of a preferred circuit for performing the method of the invention.

An advantageous embodiment of the method of the invention is shown in FIG. 8. In such case, the impedance Z is the variable to be determined. Rx is, in this embodiment, a technically necessary resistance serving for fulfilling the requirement that the magneto-inductive flow-measuring device 1 can be used in explosion-endangered areas. This resistance is in series with the actual object of the measurement, Z.

For performing the conductivity measurement, rectangular pulses are generated by a pulse generator 23 and are added, offset-free, to the electrode potential. The actual measuring electrode signal for ascertaining flow is registered continuously during the measurement by means of A/D-converter 21.

Figure 9:
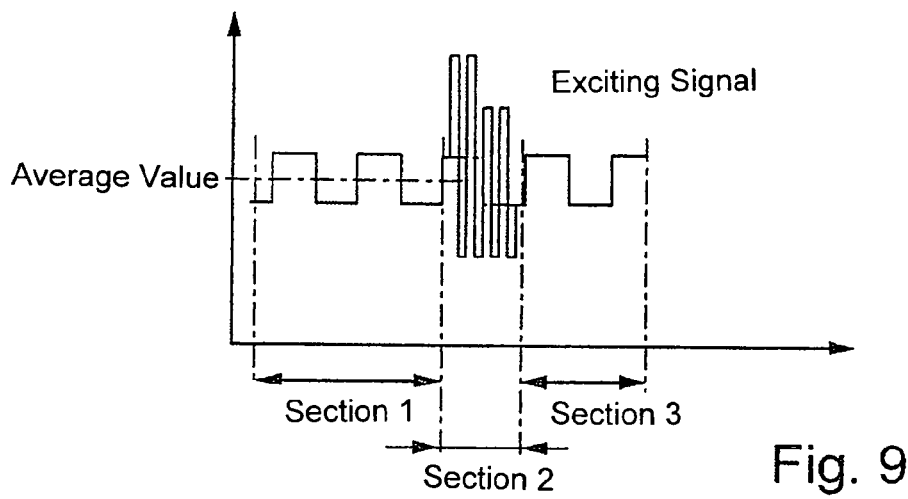
FIG. 9 is a diagram showing an exciting signal having a frequency f1 superimposed on the switching frequency for reversing the magnetic field.

FIG. 9 shows, schematically, a timing diagram for FIG. 8. The exciting, or test, signal is applied only during a relatively short Section 2 to the measuring electrode 4; 5.

Preferably, the measurement is subdivided into three sections:
1. In Section 1, the electrode potential is measured, and the current, average value of the electrode potential is formed.
2. In Section 2, switch 22 is closed and the pulse generator 23 produces a rectangularly shaped, pulse sequence with a predetermined frequency f. The pulse generation can be done synchronously or asynchronously with the switching of the magnetic field B. In the illustrated case, it is synchronous. The offset voltage of the exciting signal is set equal to the average value, as calculated in Section 1. In this way, the electrode potential is scarcely moved from equilibrium by the superimposed exciting signal.
3. In Section 3, switch 22 is opened and the data registered by means of the A/D converter 21 are evaluated.

Evaluation of the data of the A/D converter 21 from Section 2 is done according to the following method:
1. The data block is multiplied with a sine- and cosine-modulated, FIR filter function. The FIR filter function can, in the simplest case, be a rectangular window, which corresponds to a ones vector and thus drops out. Via the FIR filter function, the bandwidth of the evaluated signals can be controlled. In the case of Promag 55, because of circuit constraints, pulse generator and A/D converter are not triggered synchronously. Therefore, actual transmission frequency and actually measured frequency deviate somewhat from one another. When the evaluation method acts too selectively in the frequency range, errors arise in the evaluation.

In this way, the following equations are obtained for the real part and the imaginary part of the impedance:

$$Re(H_1) = \sum_{k=0}^{N-1} sig(k) \cdot \sin\left(2\pi \frac{f_P}{f_T} k\right) \cdot FIR(K)$$

$$Im(H_1) = \sum_{k=0}^{N-1} sig(k) \cdot \cos\left(2\pi \frac{f_P}{f_T} k\right) \cdot FIR(K)$$

with
$f_P$: pulse frequency
$f_T$: sampling frequency of A/D-converter
$Re(H_1)$: real part of a complex variable H
$Im(H_1)$: imaginary part of a complex variable H
$sig(k)$: the measured signal in Section 2
N: length of block in number of sampling points and $FIR(k) = 0.54 - 0.46 \cdot \cos(\pi \cdot (2 \cdot (k-1)+1)/N)$ is a so-called Hamming-filter.

2. The complex variable $H_1$ is divided by the pulse amplitude $A_P$ and by a further frequency-dependent, complex variable $H_E$ describing the transfer behavior of the measuring electronics.

$$H_2 = \frac{H_1}{A_P \cdot H_E(f_P)}$$

Figure 11:
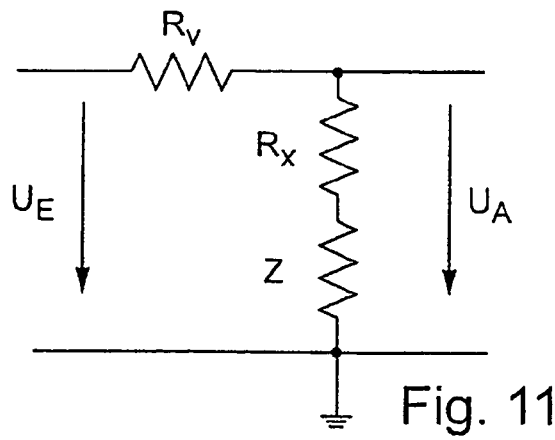
FIG. 11 is a circuit diagram of a voltage divider.

3. The impedances Z, Rx and Rv form a voltage divider, as shown in FIG. 11.

$$v = \frac{Z + Rx}{Z + Rx + Rv}$$

Solved for Z, there is thus obtained:

$$Z = Rv \cdot \frac{v}{1-v} - Rx$$

with $v = H_2$

4. The conductivity κ of the mediums 11 can, within the limits of the accuracy of measurement, be calculated from the absolute value of the complex impedance according to the following formula.
5.

$$\chi = \frac{k}{|Z|}$$

6. From the calculated result, the parameters for the rectangular pulse packet are calculated for the next measurement.

In addition, the following approach is drawn upon.
1. The method limits itself to a small number of test frequencies (e.g. to 5 frequencies, $f_1, \ldots f_5$). The method begins with an average frequency and an average amplitude.
2. At this frequency, there results a first value for the resistance $R_M$ of the medium.
3. On the basis of a table of the frequencies $f_i$ and interval boundaries for $R_M$, a new test frequency $f_n$ is obtained. The table maps, in such case, roughly, absolute value versus frequency for the assumed model.
With well chosen interval boundaries, the method always converges to a suitable frequency for the exciting signal.
4. The pulse amplitude to be expected on the impedance Z is calculated via the voltage divider formula, and the amplitude of the exciting signal is so set, that a maximum of 100 mV is applied to the impedance Z.

Preferably according to the invention, either only the amplitude spectrum or the amplitude spectrum and the phase spectrum are drawn upon for ascertaining the conductivity κ of the medium 11. If the behavior of the amplitude- and/or the phase spectrum are/is known, then the conductivity κ of the medium 11 is uniquely determinable due to the functional dependence. Different conductivities κ of media 11 result essentially in a parallel displacement of the absolute value spectrum of FIG. 3 in the direction of the y-axis. If it is known, in which frequency range the absolute value spectrum is constant, then the conductivity κ can be determined with high accuracy.

Still more accurate is the ascertainment of conductivity κ, when, additionally, the phase spectrum is drawn upon. In such case, the procedure is to ascertain the conductivity κ at the amplitude value, at which the phase value shows a minimum.

The ascertaining of the conductivity κ is done essentially simultaneously with the ascertaining of the flow of the mediums 11 through the measuring tube 2.

Besides determining conductivity κ, the method of the invention can also be used to detect a physical change on the measuring electrode 4; 5. For this purpose, in predetermined time intervals, the actual value of the frequency-independent parameter Q is compared with a desired value of Q ascertained at a predetermined starting point in time of the flow-measuring device 1. In order to reproduce the curves shown in FIGS. 7*a* and 7*b* as accurately as possible and thus to ascertain Q exactly, as many impedance values as possible at different frequencies are determined. Since corrosion or accretion formation on the measuring electrode 4; 5 does not usually happen abruptly, but, instead, slowly, it is sufficient to provide information for 'Predictive Maintenance' at relatively large time intervals.

If deviations from the desired value arise in the ascertaining of the current Q-value and such deviations lie outside of a predetermined tolerance, then such can be interpreted to the effect that a no longer tolerable change has occurred on the measuring electrode 4; 5. The change can, as already stated, be brought about by accretion formation on the measuring electrode 4; 5; it can, however, also be related to a change on the surface of the measuring electrode 4; 5 arising from corrosion. A detected change is signalled to the operating personnel. If a predetermined tolerance range is exceeded, then an alarm is triggered, since the functional ability of the flow-measuring device 1 is no longer assured. In this way, the method of the invention provides, besides the additional measurement of conductivity of the medium flowing through the flow-measuring device 1, also information residing in the realm of predictive maintenance.

Translation of German Words in the Drawing

Figure 3:
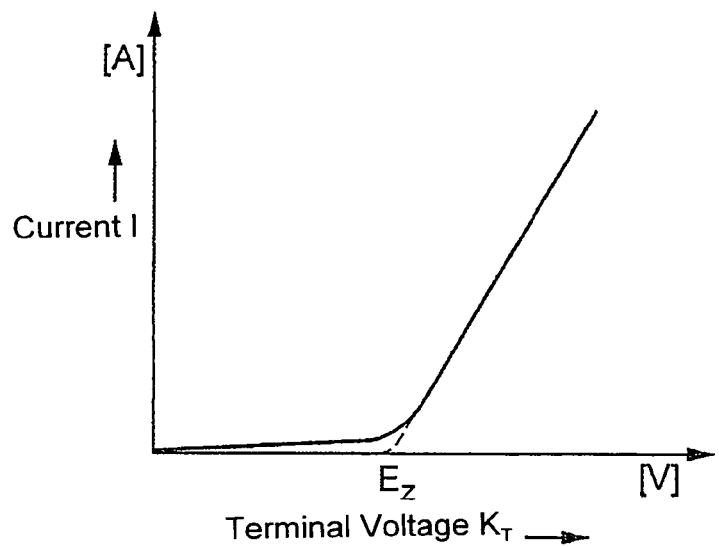
FIG. 3 is a graph showing the functional dependence of a direct current i on the terminal voltage $E_T$, when the electrical conductivity of an electrolyte solution is measured.

FIG. 3:
Change "Strom" to -Current-;
change "Klemmenspannung" to -Terminal Voltage-; and
change the subscript "Kl" to -T-.

Figure 4:
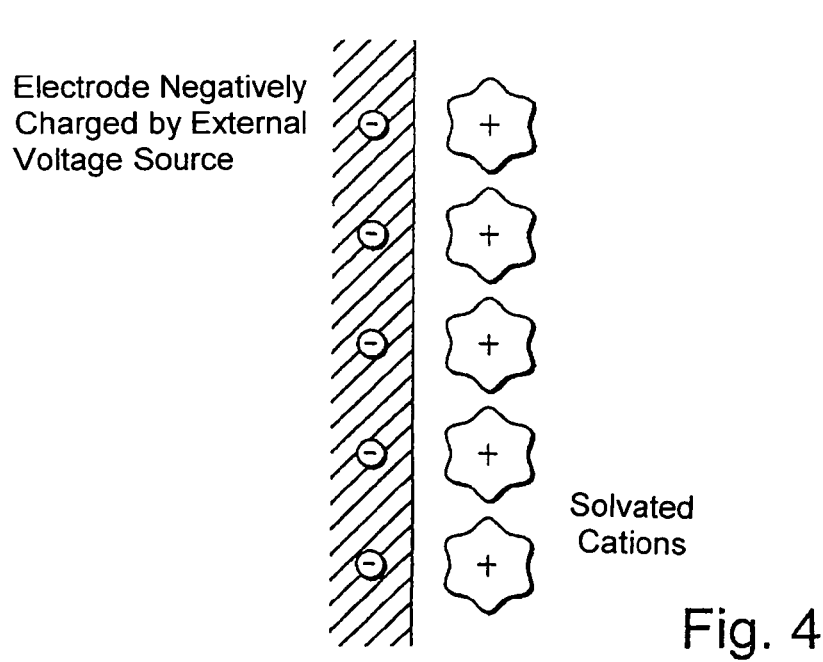
FIG. 4 is a schematic representation of the electrical double layer which forms.

FIG. 4:
Change "Durch . . . . Elektrode" to -Electrode negatively charged by external voltage source-; and
change "Solvatisierte Kationen" to -Solvated cations-.

FIG. 7*a*:
Change "Betrag Impedanz" to -Absolute Value of Impedance-.

FIG. 9:
Change "Elektrodenpotential" to -Electrode Potential-;
change "Mittelwert" to -Average Value-;
change "Erregungssignal" to -Exciting Signal-; and
change "Abschnitt" (three occurrences) to -Section-.

Figure 10:
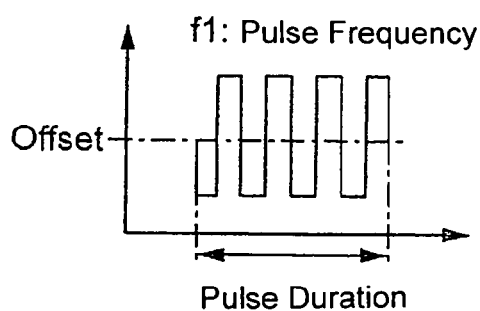
FIG. 10 is a representation of an exciting signal applied to the measuring electrode.

FIG. 10:
Change "Pulsfrequenz" to -Pulse Frequency-; and
change "Pulsdauer" to -Pulse Duration-.

The invention claimed is:

1. A method for predictive maintenance for a magneto-inductive flow-measuring device or method for determining electrical conductivity of a medium flowing through a magneto-inductive flow-measuring device, the magneto-inductive flow-measuring device includes: a magnet system, which produces a magnetic field passing through a measuring tube essentially transversely to a measuring tube axis; at least two measuring electrodes coupled with the medium, having a defined rest potential and being arranged in a region of the measuring tube lying essentially perpendicularly to the magnetic field; and a control or evaluation unit, which delivers information concerning volume- or mass-flow of the medium on the basis of measurement voltage induced in the measuring electrodes, the method comprising the steps of:
applying a first exciting signal with a first frequency ($f_1$) and at least a second exciting signal with a second frequency ($f_2$), or an exciting signal containing at least two frequencies ($f_1$, $f_2$,) to the measuring electrode in such a manner that the average value of the exciting signals or exciting signal coincides, at least approximately, with the average value of electrode potential of the measuring electrode;
detecting the conductivity ($\chi$) of the medium or change on the surface of the measuring electrode on the basis of at least one impedance value measured between the measuring electrode and the reference potential;
determining optimum frequencies ($f_1$, $f_2$, . . . ) of a pulse sequence, or sequences, at which the at least one impedance value is ascertained, as a function of the medium; and
ascertaining the conductivity of the medium on the basis of ascertained impedance values, when, at least two pulse sequences following one after the other and having different frequencies, the impedance values are equal within predetermined tolerance ranges, wherein:
frequency (f) of the pulse sequence is successively changed, until the phase value of the ascertained impedance values reaches a minimum, and, at that frequency of the pulse sequence, at which the phase value is minimum, the associated amplitude value of the impedance values is drawn upon for determining resistance ($R_m$), or for determining conductivity of the medium.

2. The method as claimed in claim 1, wherein:
a first pulse sequence with a first frequency ($f_1$) and a second pulse sequence with a second frequency ($f_2$) is applied as exciting signal.

3. The method as claimed in claim 1, wherein:
a pseudo noise having a plurality of frequencies ($f_1$, $f_2$, . . . ) is applied as exciting signal.

4. The method as claimed in claim 1, wherein:
a signal, in the case of which, following transformation from time domain to frequency domain, side bands are strongly attenuated is applied as exciting signal.

5. The method as claimed in claim 1, wherein:
in predetermined time intervals, flow measurement is interrupted, the last measured, flow measured-value is stored, or frozen; and,
at a first interruption of the flow measurement, an exciting signal having a first frequency ($f_1$) is applied to the measuring electrode, and, at a second interruption of the flow measurement, at least a second exciting signal having a second frequency ($f_2$) is applied to the measuring electrode.

6. The method as claimed in claim 1, further comprising the step of:
determining at least two frequencies ($f_1$, $f_2$), amplitude values or amplitude spectrum, or real parts of impedance values and phase values or phase spectrum, or imaginary parts of corresponding impedance values; and,
ascertaining on the basis of the real parts and imaginary parts, frequency independent parameters (n, Q) and resistance ($R_m$), or conductivity of the medium.

7. The method as claimed in claim 6, wherein:
an equivalent circuit diagram is applied to each ascertained impedance value, the equivalent circuit diagram comprising a parallel connection of a capacitor (C) representing capacitance of the measuring electrode and an ohmic resistance ($R_m$) representing resistance ($R_m$) of the medium between the potential of the measuring electrode and the reference potential, as well as an electrical component (CPE) connected in series with the ohmic resistance ($R_m$) and having a frequency-independent phase, wherein the component (CPE) is described by the following impedance:

$$Z_{CPE} = \frac{1}{Q \cdot (2\pi f \cdot i)^n}$$

with n and Q representing two frequency-independent parameters.

8. The method as claimed in claim 7, further comprising the steps of:
   comparing in predetermined intervals of time, actual value ($Q_{act}$) of a frequency-independent parameter with a desired value ($Q_{des}$) ascertained at a predetermined starting point of the flow-measuring device (1); and
   signaling a change on the surface of the measuring electrode, when deviation between the actual value ($Q_{act}$) and the desired value ($Q_{des}$) exceeds a predetermined tolerance range.

9. The method as claimed in claim 1, wherein: conductivity ($\chi$) of the medium is provided simultaneously with flow.

* * * * *